(12) United States Patent
Jeong et al.

(10) Patent No.: US 11,302,192 B2
(45) Date of Patent: Apr. 12, 2022

(54) PARKING CONTROL APPARATUS FOR VEHICLE AND METHOD THEREOF

(71) Applicants: HYUNDAI MOTOR COMPANY, Seoul (KR); KIA MOTORS CORPORATION, Seoul (KR)

(72) Inventors: Sun Woo Jeong, Suwon-si (KR); Yong Joon Lee, Incheon (KR); Jin Ho Park, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 149 days.

(21) Appl. No.: 16/654,379

(22) Filed: Oct. 16, 2019

(65) Prior Publication Data
US 2020/0410860 A1  Dec. 31, 2020

(30) Foreign Application Priority Data
Jun. 28, 2019  (KR) .................. 10-2019-0077580

(51) Int. Cl.
*G08G 1/14*  (2006.01)
*B60W 50/14*  (2020.01)
*B60W 20/12*  (2016.01)

(52) U.S. Cl.
CPC ............. *G08G 1/143* (2013.01); *B60W 20/12* (2016.01); *B60W 50/14* (2013.01); *B60W 2050/146* (2013.01)

(58) Field of Classification Search
CPC .. G08G 1/143; G08G 1/168; G08G 1/096805; G08G 1/096833; G08G 1/096855; B60W 50/14; B60W 20/12; B60W 2050/146; B60W 30/06; B60W 40/02; B60W 30/182; B60W 30/095; B60W 60/0053; B60W 2050/0005; B60W 2552/50; B62D 15/0285; B60K 35/00; B60K 2370/143; B60K 2370/152; B60Y 2300/06; B60Y 2300/182; B60Y 2300/095
See application file for complete search history.

(56) References Cited

U.S. PATENT DOCUMENTS

| | | | | |
|---|---|---|---|---|
| 2016/0284217 | A1* | 9/2016 | Lee | B60D 1/30 |
| 2018/0093663 | A1* | 4/2018 | Kim | B60W 30/06 |
| 2018/0162384 | A1* | 6/2018 | Kim | B60W 30/06 |
| 2019/0039606 | A1* | 2/2019 | Fujita | B60R 21/00 |

FOREIGN PATENT DOCUMENTS

WO  WO-2018049715 A1 * 3/2018 ............. G08G 1/143

* cited by examiner

*Primary Examiner* — Brian Wilson
(74) *Attorney, Agent, or Firm* — McDonnell Boehnen Hulbert & Berghoff LLP

(57) ABSTRACT

Disclosed are a parking control apparatus for a vehicle and a method thereof. The parking control apparatus includes a processor that searches for at least one parking space in a parking control of a vehicle, calculates an estimated route and a required parking time for each of the at least one parking space, and performs parking control into a target parking space which is one parking space selected from the at least one parking space by a user, and a display that displays the estimated route and the required parking time for each of the at least one parking space.

12 Claims, 15 Drawing Sheets

PARKING CONTROL APPARATUS FOR VEHICLE AND METHOD THEREOF

CROSS-REFERENCE TO RELATED APPLICATION

This application claims the benefit of priority to Korean Patent Application No. 10-2019-0077580, filed in the Korean Intellectual Property Office on Jun. 28, 2019, the entire contents of which are incorporated herein by reference.

TECHNICAL FIELD

The present disclosure relates to a parking control apparatus for a vehicle and a method thereof, and more particularly, to an automatic parking control technique that reflects user intention.

BACKGROUND

As there have been developed various kinds of sensors and electronic equipment for vehicles, a vehicle having a driving assistance function for assisting user driving and improving driving safety and convenience has been attracting attention.

Particularly, there has been a growing interest in automatic parking technology that automatically performs parking in which a user has difficulty to operate. Thus, a technique for detecting a parking line using a sensor such as a camera and performing automatic parking in a parking space detected in the parking line has been developed. In addition, a remote smart assist system has been developed as an automatic parking technique.

However, according to a conventional remote smart parking assist system, when an object or a parking line is checked to search for a plurality of parking spaces and the parking spaces are displayed, one of the displayed parking spaces is selected by the user and the parking to the selected parking space is controlled. However, it is impossible to know which parking space is optimal for the user among the plurality of parking spaces and whether the parking space reflects the tendency of the user.

That is, it is difficult to select an optimal parking space because there is not enough information for selecting a parking space required for selecting one of the plurality of parking spaces in the parking assist system based on the conventional remote smart parking assist system. In addition, because after the parking control, the parking space does not match the intention desired by the user, the user may directly and additionally adjust the position, so that the user complaints may be increased.

SUMMARY

The present disclosure has been made to solve the above-mentioned problems occurring in the prior art while advantages achieved by the prior art are maintained intact.

An aspect of the present disclosure provides a parking control apparatus which is capable of providing information about a parking space to a user in support of automatic parking such that a parking space can be selected suitable to user intention, and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a parking control apparatus includes a processor that searches for at least one parking space in a parking control of a vehicle, calculates an estimated route and a required parking time for each of the at least one parking space, and performs parking control into a target parking space which is one parking space selected from the at least one parking space by a user, and a display that displays the estimated route and the required parking time for each of the at least one parking space.

The processor may perform the parking control based on a parking target mode or a parking alignment mode input by the user.

The parking target mode may include a shortest time parking mode in which parking is completed in a shortest time, and an optimum alignment parking mode in which the vehicle is parked in the target parking space and is arranged to keep a distance from a parking line or an obstacle.

The processor may calculate an estimated parking route and a required parking time for the target parking space in the parking target mode and the parking alignment mode, and the display may display the estimated parking route and the required parking time in the parking target mode and the parking alignment mode.

The parking alignment mode may include an obstacle proximity parking mode in which the vehicle approaches an obstacle, a center-alignment parking mode, a driver seat convenience parking mode, and a passenger seat convenience parking mode.

The processor may determine whether the vehicle is moving when one of the at least one parking space is not selected by the user, and search for a parking space when the vehicle is moving.

The processor may calculate a remaining time until the parking completion in the required parking time during the parking control to the target parking space, and the display may display the remaining time.

The display may transfer, to the processor, information about one of the at least one parking space displaced on a screen when the one parking space is touched.

The display may list and display the parking target mode or the parking alignment mode and receive a selection of one of listed menus by a user.

The processor may list the parking target mode or the parking alignment mode on a screen and deactivate a menu having no selection information among the listed menus.

According to another aspect of the present disclosure, a parking control apparatus includes a processor that searches for at least one parking space when a vehicle is automatically parked, calculates an estimated route and a required parking time for each of the at least one parking space, and performs parking control into a target parking space which is one parking space selected from the at least one parking space by a user, and a display that displays the estimated route and the required parking time for each of the at least one parking space.

The processor may calculate an estimated route and a required parking time for realigning a parking space in which the vehicle is currently parked when a parking realignment mode is selected by the user after manual parking of the vehicle is completed and control a parking realignment.

The processor may receive the parking realignment mode input from the user when performing the parking realignment and control the parking realignment based on the inputted parking alignment mode.

According to still another aspect of the present disclosure, a parking control apparatus includes a processor that searches for an exit space upon entry into an exit mode, calculate an estimated route and a required exit time in each exit direction, and control an exit of a vehicle in an exit direction selected by a user, and a display that displays the estimated route and the required exit time in each exit direction.

The processor may control the exit of the vehicle based on an exit target mode when controlling the exit of the vehicle in the selected exit direction.

The exit target mode may include a shortest time exit mode in which the exit of the vehicle is completed in a shortest time and an optimum separation exit mode in which the vehicle is controlled to maintain a specified distance from an obstacle.

The processor may calculate the estimated route and the required exit time in each exit direction every time the exit target mode is changed by a user, and the display may display the estimated route and the required exit time in each exit direction in the changed exit target mode.

According to still another aspect of the present disclosure, a parking control method includes searching for at least one parking space in a parking control of a vehicle, calculating an estimated route and a required parking time for each of the at least one parking space, displaying the estimated route and the required parking time calculated for each of the at least one parking spaces, receiving a selection of one of the at least one parking space by a user as a target parking space, and performing parking control to the target parking space.

The performing of the parking control to the target parking space may include performing the parking control based on a parking target mode or a parking alignment mode input from the user.

The parking target mode may include a shortest time parking mode in which parking is completed in a shortest time, and an optimum alignment parking mode in which the vehicle is parked in the target parking space and is arranged to keep a distance from a parking line or an obstacle, and the parking alignment mode may include an obstacle proximity parking mode in which the vehicle approaches an obstacle, a center-alignment parking mode, a driver seat convenience parking mode, and a passenger seat convenience parking mode.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
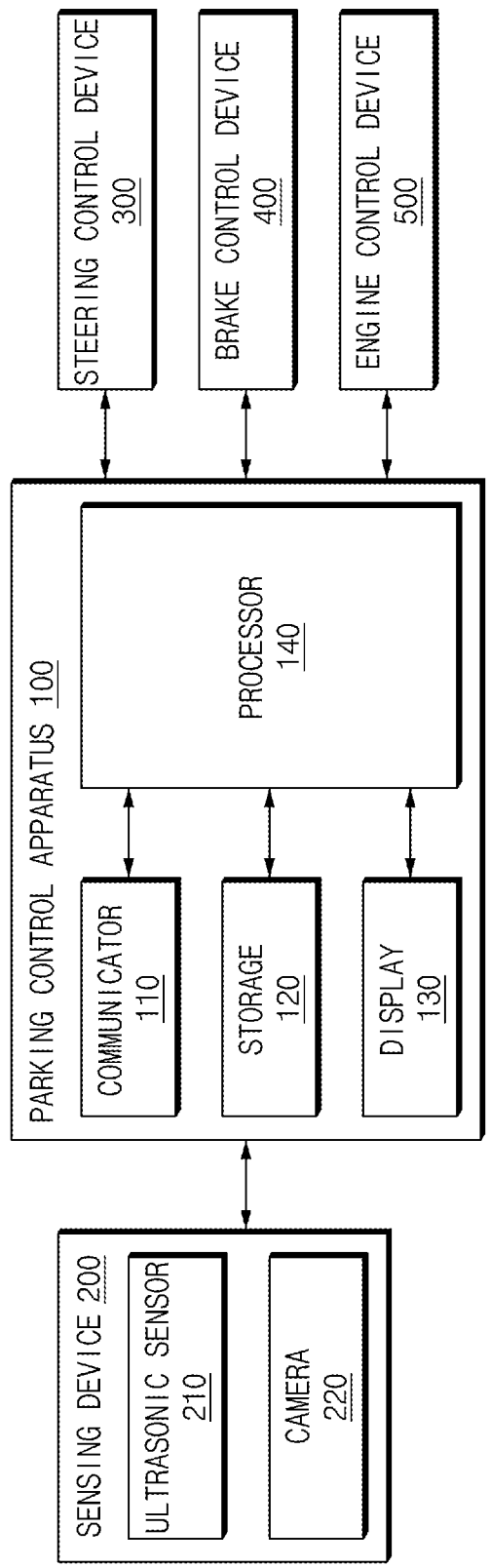
FIG. 1 is a block diagram illustrating a configuration of a vehicle system including a parking control apparatus according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure may be applied to remote smart parking assist (RSPA) technology.

Hereinafter, embodiments of the present disclosure will be described in detail with reference to FIGS. 1 to 9.

FIG. 1 is a block diagram illustrating a configuration of a vehicle system including a parking control apparatus according to an embodiment of the present disclosure.

Referring to FIG. 1, a vehicle system according to an embodiment of the present disclosure may include a parking control apparatus 100, a sensing device 200, a steering control device 300, a brake control device 400, and an engine control device 500.

The parking control apparatus 100 may search for at least one parking space in the parking control of a vehicle, calculate an estimated route and a required parking time for each of the at least one parking space, and perform parking control into a target parking space which is one parking space selected from the at least one parking space by a user.

The parking control apparatus 100 may include a communicator 110, storage 120, a display 130, and a processor 140.

The communicator 110 is a hardware device implemented by various electronic circuits for transmitting and receiving a signal through a wireless or wired connection. In the present disclosure, in-vehicle communication may be performed through CAN communication, LIN communication, Ethernet communication, or the like and the communicator 110 may communicate with the sensing device 200, the steering control device 300, the brake control device 400, the engine control device 500, and the like.

The storage 120 may store a sensing result of the sensing device 200, and parking space information, estimated parking route information, required parking time, and the like obtained by the processor 140. The storage 120 may include at least one type of a storage medium of memories of a flash memory type, a hard disk type, a micro type, a card type (e.g., a secure digital (SD) card or an extreme digital (XD) card), and the like, and a random access memory (RAM), a static RAM, a read-only memory (ROM), a programmable ROM (PROM), an electrically erasable PROM (EEPROM), a magnetic memory (MRAM), a magnetic disk, and an optical disk type memory.

The display 130 may display the parking space, the estimated parking route for each parking space, and the required parking time, the remaining time until parking is completed during parking control, a parking alignment mode menu list, a parking target mode menu list, an exit target mode menu list, an estimated exit route for each exit direction, a required exit time, and the like, and receive a menu selection from the user. The display 130 may be implemented as a head-up display (HUD), a cluster, an audio video navigation (AVN), or the like. In addition the display 130 may include at least one of a liquid crystal display (LCD), a thin film transistor liquid crystal display (TFT LCD), a light emitting diode (LED) display, an organic light emitting diode (OLED) display, an active matrix OLED (AMOLED) display, a flexible display, a bended display, and a 3D display. Some of these displays may be implemented as transparent displays that are transparent or translucent to allow viewing of an outside. In addition, the display 130 may be provided as a touch screen including a touch panel, and may be used as an input device in addition to an output device.

The processor 140 may be electrically connected to the communicator 110, the storage 120, the display 130, and the like, electrically control each configuration, and may be an electrical circuit that executes software commands, thereby performing various data processing and calculations described below.

The processor 140 may search for at least one parking space in the parking control of the vehicle, calculate an estimated route and a required parking time for each of the at least one parking space, and perform parking control into a target parking space which is one parking space selected from the at least one parking space by a user.

The processor 140 may perform the parking control based on a parking target mode or a parking alignment mode input by the user. In this case, the parking target mode may include a shortest time parking mode in which parking may be completed in the shortest time, and an optimum alignment parking mode in which the vehicle may be parked in the target parking space and is arranged to keep a distance from a parking line or an obstacle (e.g., a neighbor vehicle, a column, a wall, and the like). That is, the shortest time parking mode is a mode in which the parking control is performed based on the shortest time even though the alignment of the vehicle is skewed or shifted to one side. The optimum alignment parking mode is a mode in which the vehicle is arranged to be spaced apart from a parking line or an obstacle even though parking takes a long time.

In addition, the parking alignment mode may include an obstacle proximity parking mode in which the vehicle approaches an obstacle, a center-alignment parking mode in which the vehicle is arranged in the center of the parking space, a driver seat convenience parking mode in which the vehicle is arranged such that the distance between a driver seat and an obstacle on a driver seat side is larger than the distance between a passenger seat and the obstacle on a passenger seat side to allow a driver to easily get off the driver seat, and a passenger seat convenience parking mode in which the vehicle is arranged such that the distance between the passenger seat and the obstacle on the passenger seat side is larger than the distance between the driver seat and the obstacle on the driver seat side to allow a passenger to easily get off the passenger seat.

For the target parking space, the processor 140 may calculate the estimated parking route and the required parking time based on the parking target mode and the parking alignment mode. In this case, the estimated parking route and the required parking time calculated in the parking target mode and parking alignment mode may be displayed through the display 130.

The processor 140 may determine whether the vehicle is moving when one of the at least one parking space is not selected by the user, and search the parking spaces again when the vehicle is moving.

The processor 140 may calculate the remaining time until the parking completion in parking during the parking control to the target parking space, and the remaining time may be displayed through the display 130. In this case, when one of the at least one parking space displayed on a screen is touched, the display 130 transmits information of the touched parking space to the processor 140, so that the processor 140 determines the touched parking space as the target parking space.

The processor 140 may list the parking target mode or the parking alignment mode on the screen, but may deactivate the menu having no selection information among the listed menus. For example, when the parking alignment mode is the obstacle proximity parking mode, the center-alignment parking mode, the driver seat convenience parking mode, and the passenger seat convenience parking mode and the obstacle proximity parking mode menu may be deactivated to prevent a user from selecting the obstacle proximity parking mode menu when obstacles (pillars, walls) are not recognized.

The processor 140 may search for at least one parking space in the automatic parking of the vehicle, calculate the estimated route and the required parking time for each of the at least one parking space, and perform the parking control into the target parking space which is one parking space selected from the at least one parking space by the user.

When a parking realignment mode is selected by the user after manual parking of the vehicle is completed, the processor 140 may calculate an estimated route and a required parking time for realigning a parking space in which the vehicle is currently parked and control a parking realignment.

The processor 140 may receive the parking realignment mode input from the user when the parking realignment is performed and may control the parking realignment based on the inputted parking alignment mode.

The processor 140 may search for an exit space upon entry into an exit mode, calculate an estimated route and a required exit time in each exit direction, and control an exit of a vehicle in an exit direction selected by the user.

The processor 140 may control the exit of the vehicle based on the exit target mode selected by the user when controlling the exit of the vehicle in the selected exit direction. In this case, the exit target mode may include a shortest time exit mode in which the exit of the vehicle is completed in a shortest time and an optimum separation exit mode in which the vehicle is controlled to maintain a specified distance from an obstacle.

The processor 140 may calculate the estimated route and the required exit time in each exit direction every time the exit target mode is changed by the user, and display the estimated route and the required exit time in each exit direction in the changed exit target mode through the display 130.

The sensing device 200 may include a plurality of sensors for sensing a parking space, an exit space, a parking lot line, and an object outside vehicle. To this end, the sensing device 200 may include an ultrasonic sensor 210, a camera 220, and the like. Although not shown in FIG. 1, the sensing device 200 may include a radar, a laser scanner, a corner radar, a LIDAR, an acceleration sensor, a yaw rate sensor, a torque measurement sensor, a wheel speed sensor, a steering angle sensor, and the like to search for a parking space and calculate a required parking time.

In the present disclosure, the parking space may be detected by using the ultrasonic sensor 210. It is possible to determine whether there is an obstacle by using the camera 220. The current location of the vehicle may be estimated to generate a parking route by using the wheel speed sensor, the steering angle sensor, the ultrasonic sensor, and the like. In addition, the location of the target parking space, the size of the target parking space, the parking information (e.g., the estimated parking route, the required parking time, and the like) may be obtained through the sensing device 200.

The steering control device 300 may be configured to control the steering angle of a vehicle, and may include a steering wheel, an actuator interworking with the steering wheel, and a controller for controlling the actuator.

The brake control device 400 may be configured to control the braking of the vehicle, and may include a controller for controlling a brake.

The engine control device 500 may be configured to control the engine drive of the vehicle, and may include a controller that controls the speed of the vehicle.

The steering control device 300, the brake control device 400, and the engine control device 500 move the vehicle to the target parking space in cooperation with the parking control apparatus 100.

Figure 2A:
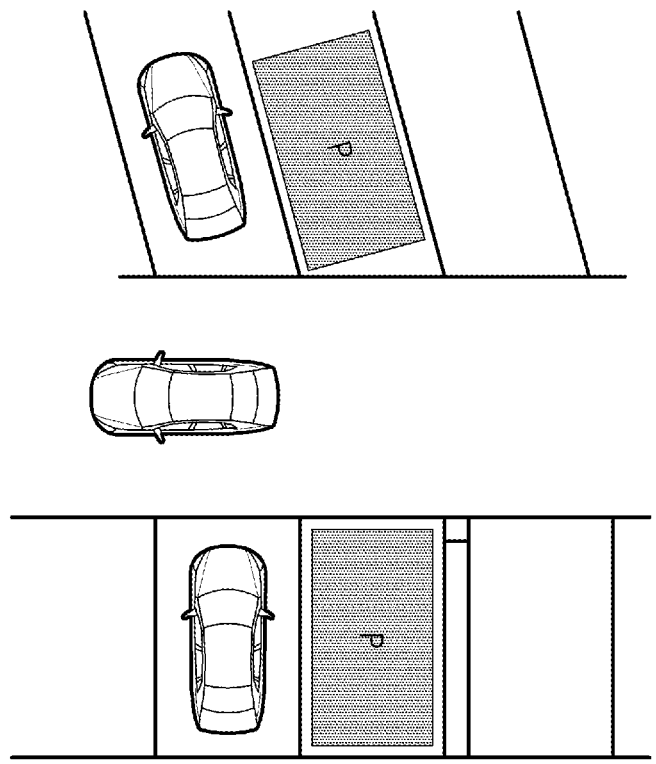
FIG. 2A is a view illustrating an example of searching a plurality of parking spaces by a parking control apparatus according to an embodiment of the present disclosure.

FIG. 2A is a view illustrating an example of searching a plurality of parking spaces by a parking control apparatus according to an embodiment of the present disclosure.

Figure 2B:
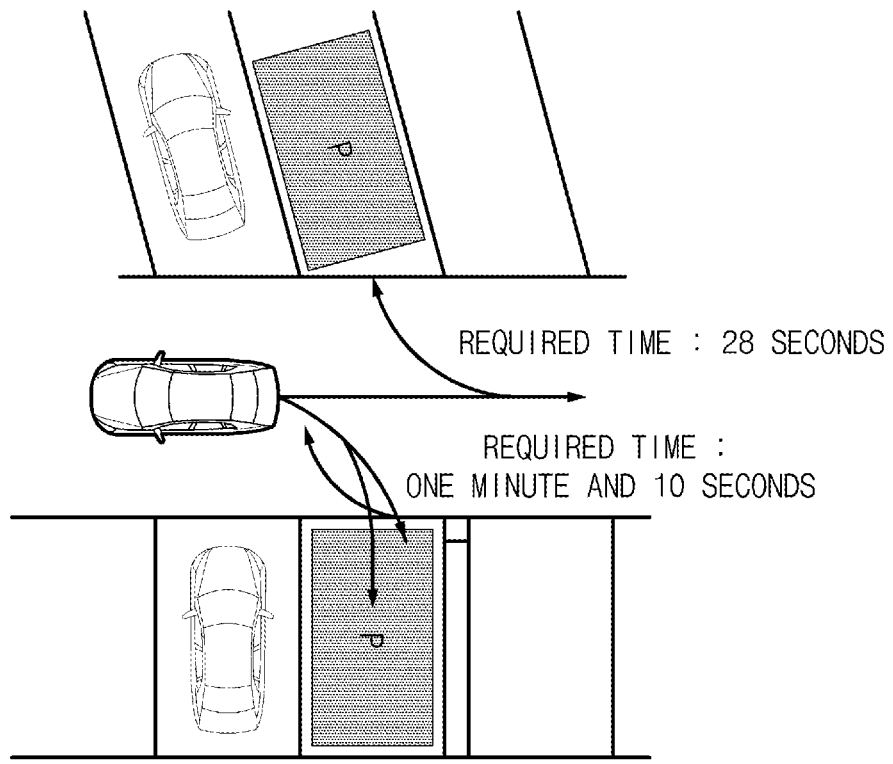
FIG. 2B is a view illustrating an example of displaying the required parking time on a plurality of parking space search screens of the parking control apparatus according to an embodiment of the present disclosure.

FIG. 2B is a view illustrating an example of displaying the required parking time on a plurality of parking space search screens of the parking control apparatus according to an embodiment of the present disclosure. Referring to FIG. 2B, it may be understood that the parking control apparatus 100 displays the estimated route and the required time for the searched parking space.

Figure 2C:
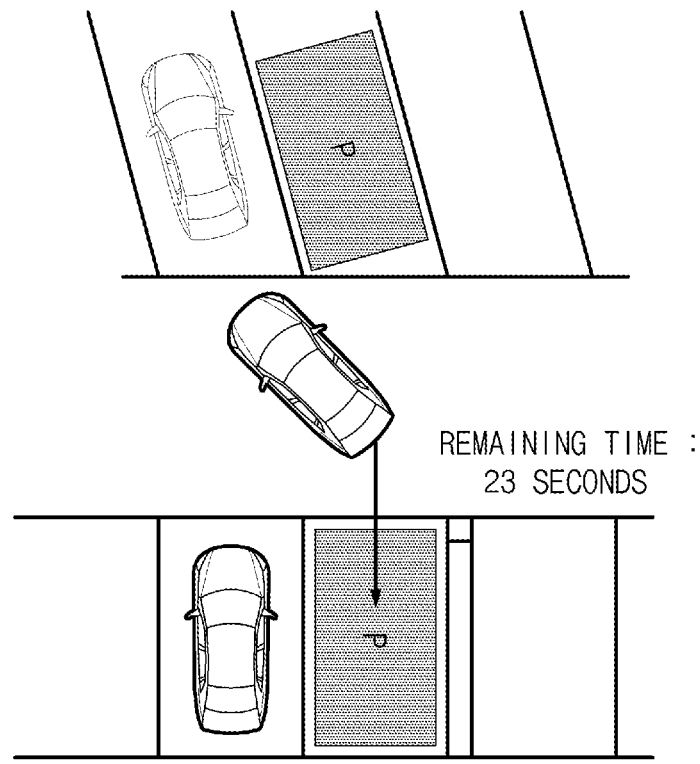
FIG. 2C is a view illustrating an example of remaining time during parking control of the parking control apparatus according to an embodiment of the present disclosure.

FIG. 2C is a view illustrating an example of remaining time during parking control of the parking control apparatus according to an embodiment of the present disclosure. Referring to FIG. 2C, it may be understood that the parking control apparatus 100 displays the remaining time during control.

Figure 3:
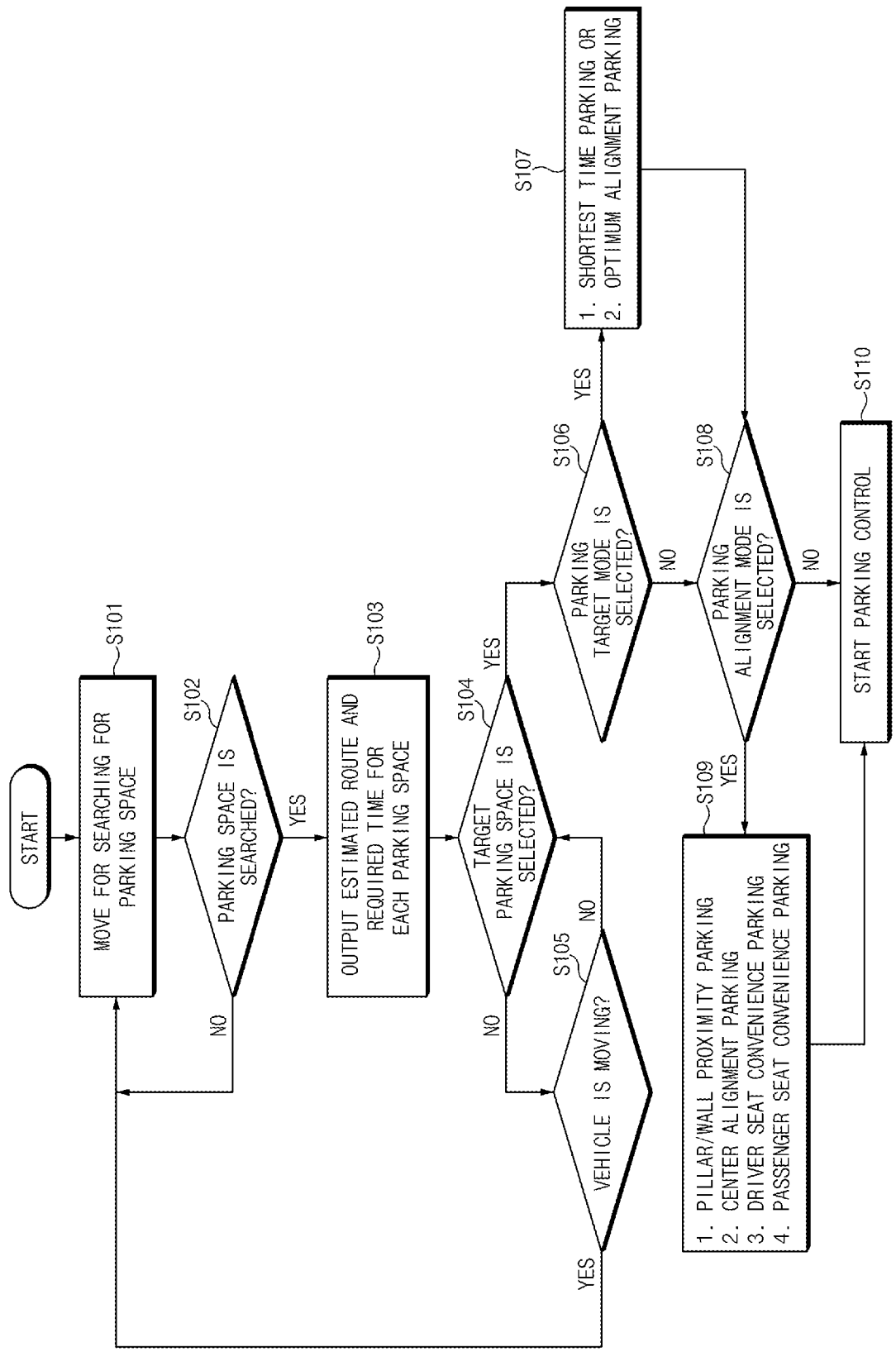
FIG. 3 is a flowchart illustrating a parking control method according to an embodiment of the present disclosure.

Hereinafter, a parking control method according to an embodiment of the present disclosure will be described with reference to FIG. 3. FIG. 3 is a flowchart illustrating a parking control method according to an embodiment of the present disclosure.

Hereinafter, it is assumed that the parking control apparatus 100 of FIG. 1 performs the process of FIG. 3. In addition, in the description of FIG. 3, it may be understood that the operations described as being performed by the apparatus are controlled by the processor 140 of the parking control apparatus 100.

Referring to FIG. 3, in operation S101, the parking control apparatus 100 moves for searching for a parking space when entering the parking mode.

The parking control apparatus 100 determines whether a parking space is found in operation S102, and when a parking space is found, the parking control apparatus 100 calculates the estimated route and the required time for each parking space and displays on a parking space screen in operation S103. In this case, the estimated route and the required time for each parking space may be output through the display 130. In this case, the types of supportable parking spaces may include reverse right angle parking, forward right angle parking, reverse parallel parking, backward diagonal parking, forward diagonal parking, and the like. In addition, the parking control apparatus 100 may estimate the moving route of the vehicle to park the vehicle in the parking space to calculate the estimated route, and calculate the time it takes to travel along the estimated route.

The parking control apparatus 100 may determine whether the target parking space is selected by the user in operation S104. When the target parking space is not selected, the parking control apparatus 100 may determine whether the vehicle is in a moving state in operation S105. When the vehicle is in the moving state, the parking control apparatus 100 may determine that the vehicle is moving for a new search for a parking space.

Meanwhile, in operation S106, when the user selects the target parking space, the parking control apparatus 100 determines whether the parking target mode is selected. In this case, when the parking space outputted to the display 130 is touched by the user, the corresponding parking space may be selected.

When the parking target mode is selected, the parking control apparatus 100 receives a selection of the shortest-time parking mode or the optimum alignment parking mode as the parking target mode in operation S107.

Meanwhile, when the parking target mode is not selected, or when one of the shortest-time parking mode and the optimum alignment parking mode is selected, the parking control apparatus 100 receives the selection of the parking alignment mode in operation S108.

When the parking alignment mode is selected, the parking control apparatus 100 may receive the selection of one of the obstacle (e.g., a pillar a wall, or like) proximity parking mode, the center-alignment parking mode, the driver seat convenience parking mode, and the passenger seat convenience parking mode. In this case, the optimum alignment parking mode and the center alignment parking mode may be set as default, and the user may change the parking target mode and the parking alignment mode.

When the parking alignment mode is selected, the parking control apparatus 100 performs parking control in the corresponding parking alignment mode in operation S110.

When the parking control is performed without selecting the parking target mode in operation S107 and the parking alignment mode in operation S108, in operation S110, the parking control apparatus 100 performs the parking control based on the parking target mode and the parking alignment mode set as default.

The default setting of the parking target mode in operation S107 corresponds to optimum alignment parking, and the default setting of the parking alignment mode in operation S109 corresponds to center alignment parking.

The default settings of the parking target mode in operation S107 and the parking alignment mode in operation S109 may be changed through a separate user input device. Although the user input device is not shown in FIG. 1, the user input device may be implemented with a user interface input device 1400 of FIG. 9.

As described above, the parking control apparatus 100 of the present disclosure may search for one parking space when the user travels to search for a parking space, and may search for a plurality of parking spaces corresponding to the surrounding environment. In addition, the parking control apparatus 100 may display estimated parking routes and required time for one or a plurality of searched parking spaces on a screen so that the user predicts the parking situation and it is possible to support a parking system that is suitable for personal preference.

In addition, when the target parking space is selected, the parking control apparatus 100 selects the parking target mode to select whether to perform parking in the shortest time even if the parking alignment is slightly changed, or to complete the optimum alignment even if the parking time takes a little longer, thereby supporting the parking system suitable for user preference.

In addition, the parking control apparatus 100 selects the parking alignment mode and is set in the center parking mode as default. However, the user may select at least one of the pillar/wall proximity parking, the center alignment parking, the driver seat convenience parking, and the like.

The parking control apparatus 100 may then start the parking control by reflecting such set parking target and mode on the control mode.

Figure 4A:
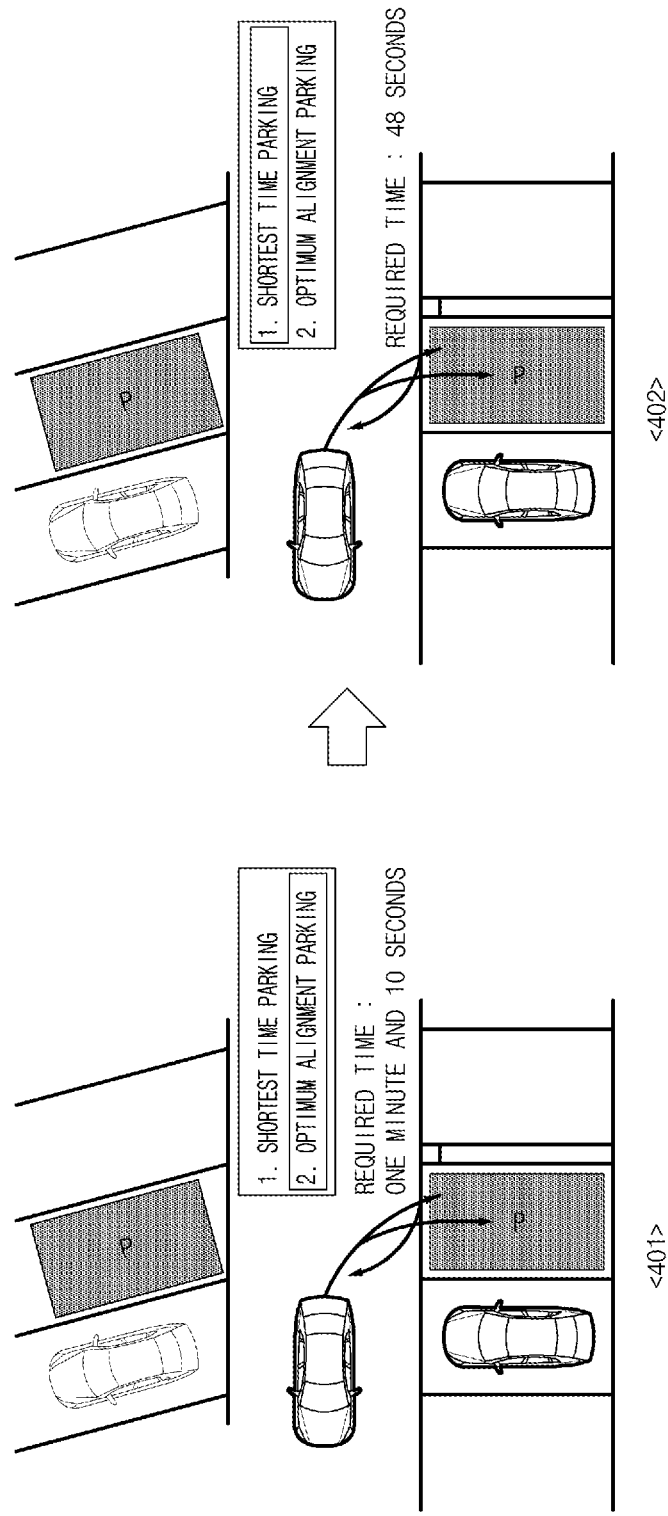
FIG. 4A is a view illustrating a screen for selecting a parking target mode by a parking control apparatus according to an embodiment of the present disclosure.

FIG. 4A is a view illustrating a screen for selecting a parking target mode by a parking control apparatus according to an embodiment of the present disclosure. FIG. 4A illustrates an example in which the required time of 1 minute and 10 seconds is taken when the optimum alignment parking mode is selected (401), and an example in which the required time of 48 seconds is taken when the shortest time parking mode is selected (402).

Figure 4B:
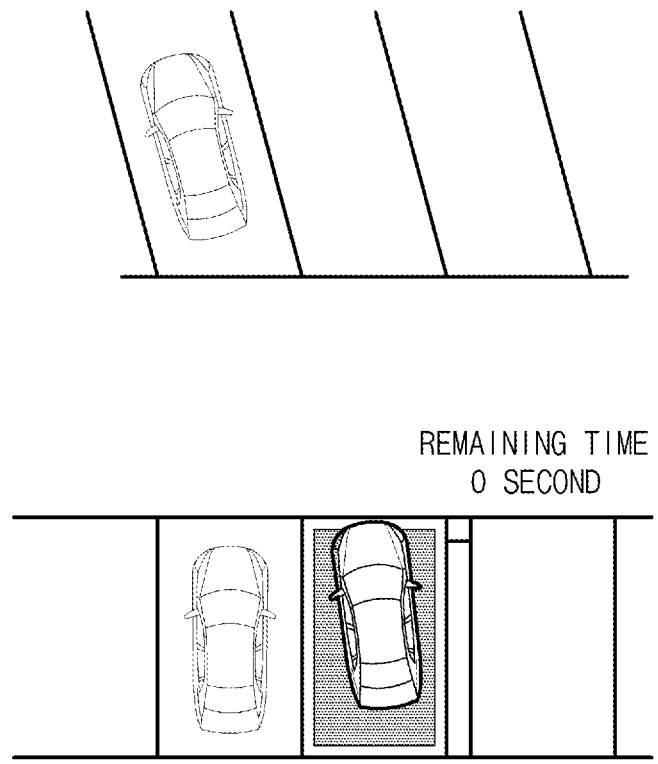
FIG. 4B is a view illustrating an example of the shortest time parking mode of the parking control apparatus according to an embodiment of the present disclosure.
Figure 4C:
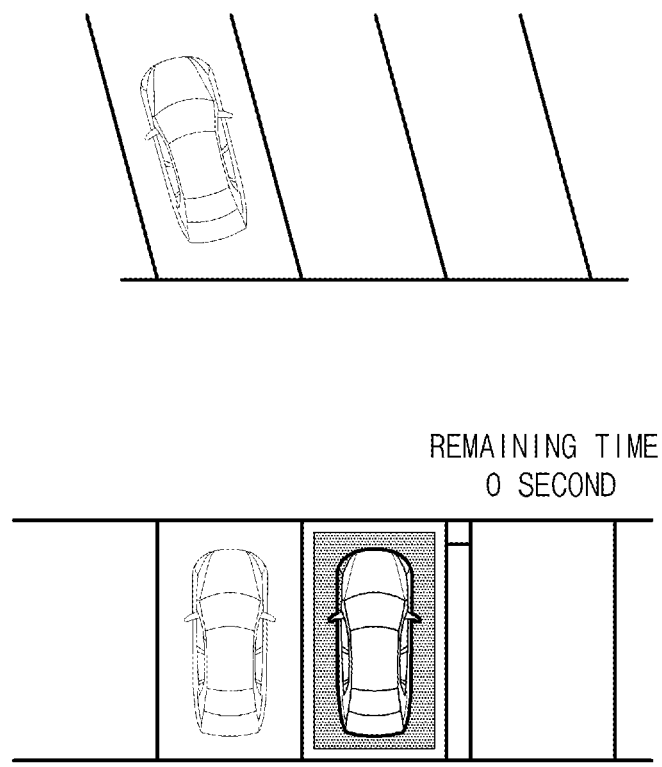
FIG. 4C is an exemplary view illustrating an optimum alignment parking mode of a parking control apparatus according to an embodiment of the present disclosure.

FIG. 4B is a view illustrating an example of the shortest time parking mode of the parking control apparatus according to an embodiment of the present disclosure. FIG. 4C is an exemplary view illustrating an optimum alignment parking mode of a parking control apparatus according to an embodiment of the present disclosure. FIG. 4B illustrates an example in which the vehicle alignment is slightly skewed after parking is completed in the shortest time parking mode. FIG. 4C illustrates an example in which a vehicle is parked in center alignment when parking is completed in the optimum alignment parking mode. When the shortest time parking mode is selected, the parking control apparatus 100 completes parking when it is determined that the parking is completed even though the parking alignment is skewed. The parking control apparatus 100 completes parking in parallel on the basis of the left or right target vehicle or the recognized parking line even though it takes a little time in the optimum alignment parking mode. When the user changes the parking target mode, the parking control apparatus 100 may change and display the expected time and route corresponding to the target parking mode. In addition, the parking control apparatus 100 may perform automatic parking control in a preset basic mode (e.g., the optimum alignment parking mode or the center alignment mode) when there is no input for selecting the target parking mode and the parking alignment mode from the user.

Figure 4D:
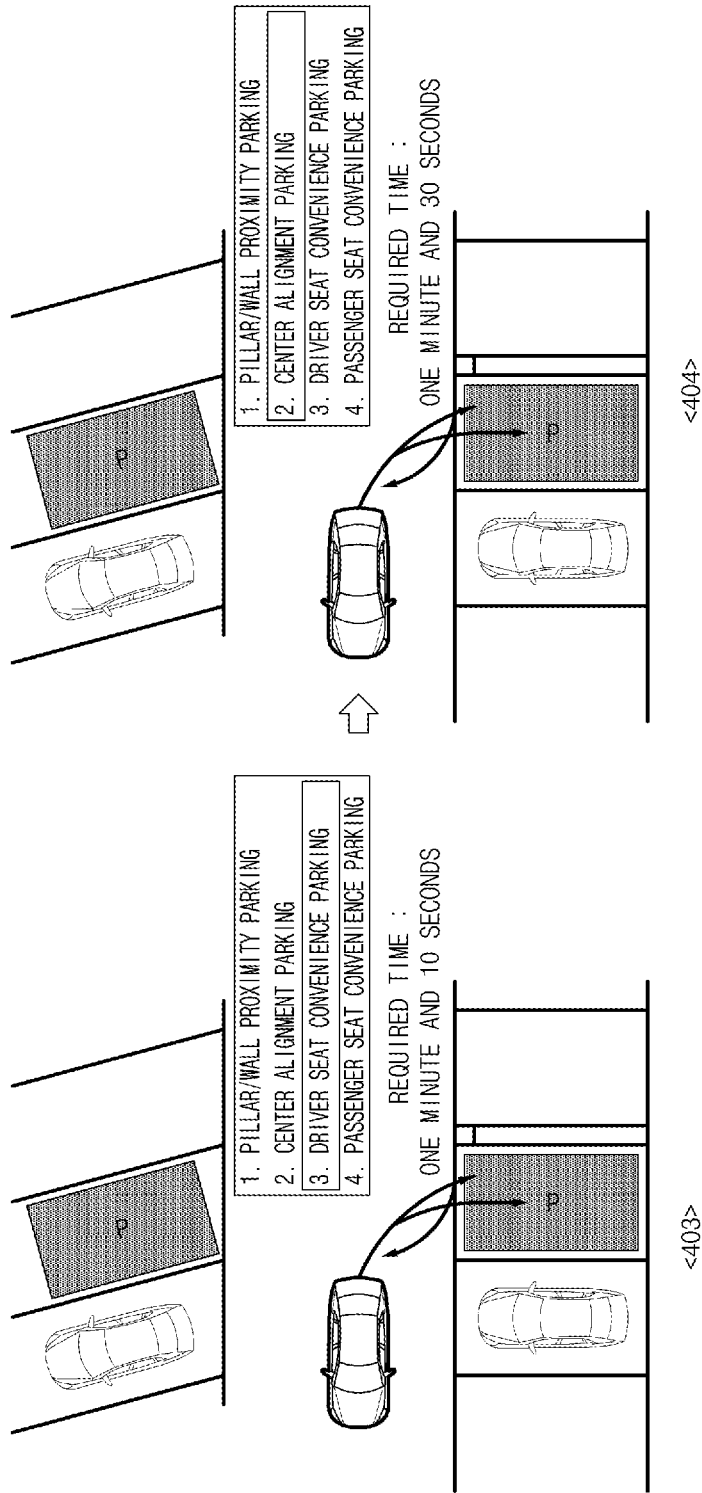
FIG. 4D is an exemplary view illustrating a screen for selecting a parking alignment mode of a parking control apparatus according to an embodiment of the present disclosure.
Figure 4E:
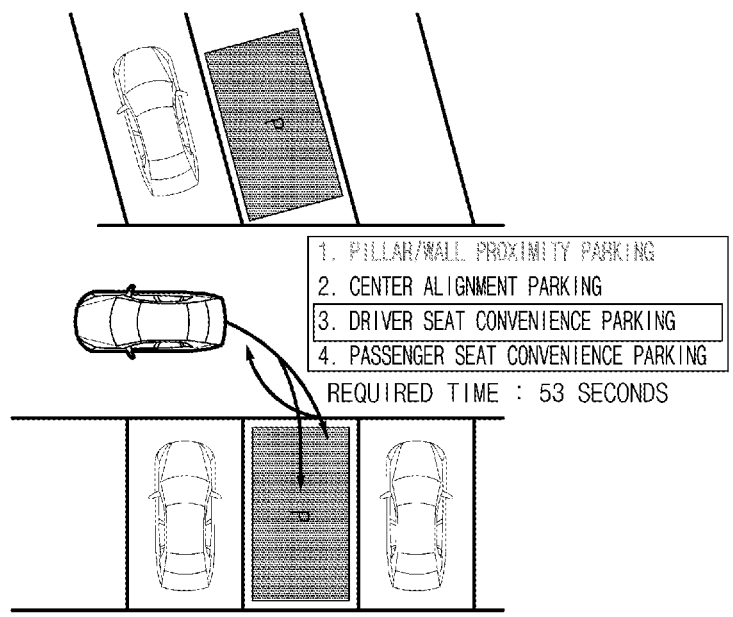
FIG. 4E is an exemplary view illustrating the non-recognition of a pillar/wall of a parking control apparatus according to an embodiment of the present disclosure.

FIG. 4D is an exemplary view illustrating a screen for selecting a parking alignment mode of a parking control apparatus according to an embodiment of the present disclosure. FIG. 4E is an exemplary view illustrating the non-recognition of a pillar/wall of a parking control apparatus according to an embodiment of the present disclosure. Referring to FIG. 4D, the required time is displayed when the driver seat convenience parking mode is selected (403), and the required parking time is displayed in the center alignment parking mode (404). FIG. 4E illustrates an example in which the pillar/wall proximity parking mode button is deactivated when the pillar/wall is not recognized.

The parking control apparatus 100 may receive the selection of the parking alignment mode after the parking target mode is selected, which is basically set as center alignment parking. In addition, when the parking alignment mode is changed by the user, the parking control apparatus 100 may change and display the estimated required time and route of the target parking space.

Figure 5:
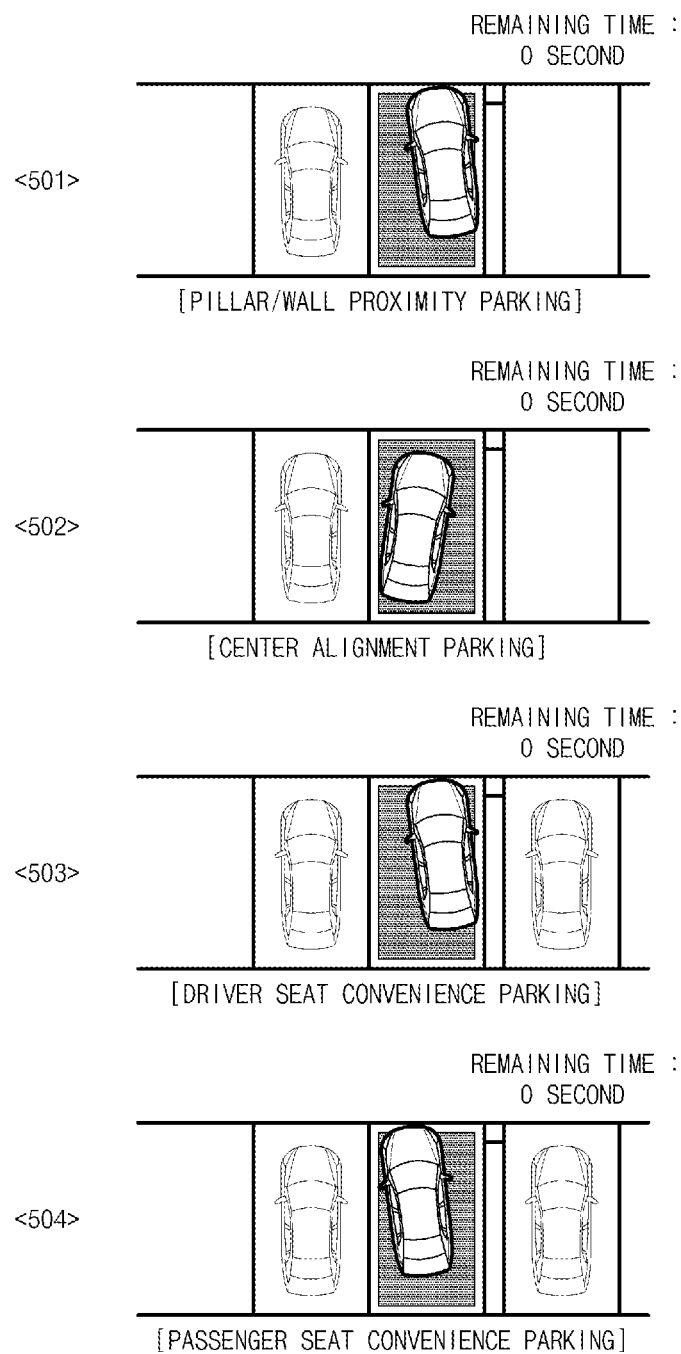
FIG. 5 is an exemplary view illustrating a setting of the shortest time parking mode of a parking control apparatus according to an embodiment of the present disclosure.

FIG. 5 is an exemplary view illustrating a setting of the shortest time parking mode of a parking control apparatus according to an embodiment of the present disclosure. FIG. 5 illustrates examples in the pillar/wall proximity parking mode (501), the center alignment parking mode (502), the driver seat convenience parking mode (503), and the passenger seat convenience parking mode (504) when the parking control apparatus 100 controls parking in the shortest time parking mode. That is, the parking control apparatus 100 may perform the parking alignment in the shortest time even though the alignment of the vehicle is skewed.

Figure 6:
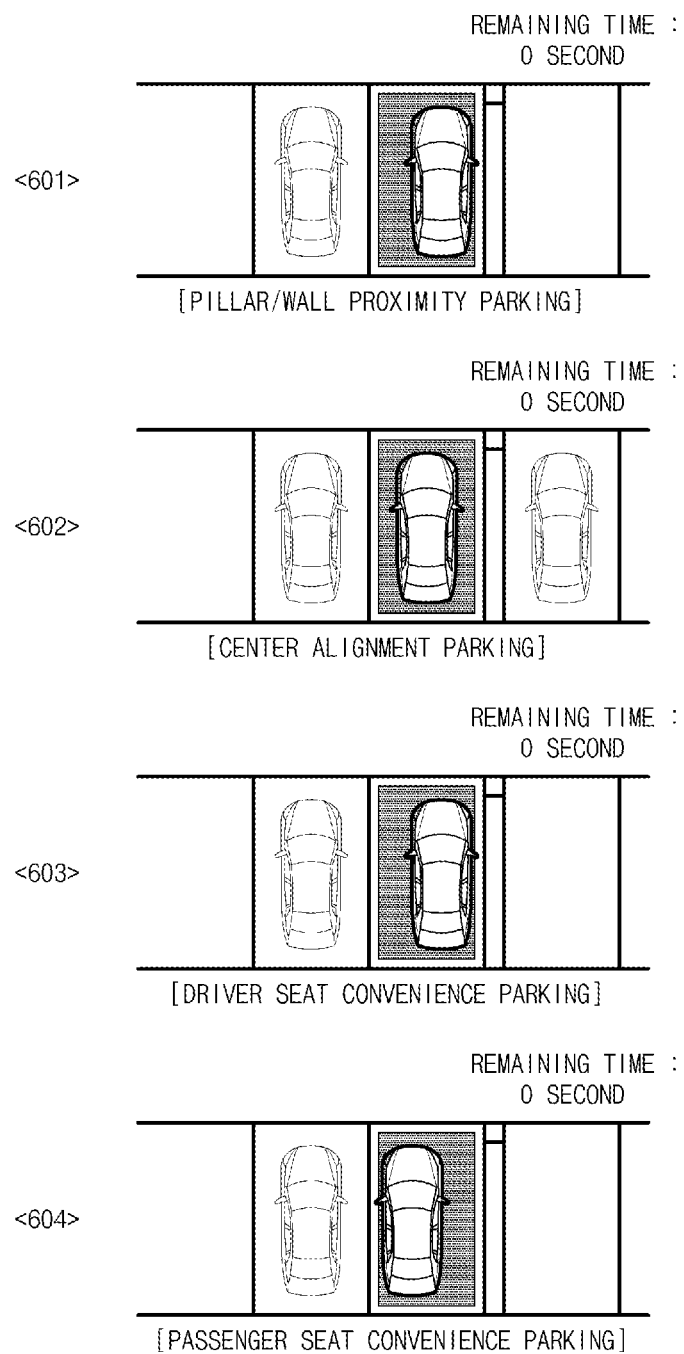
FIG. 6 is an exemplary view illustrating setting of an optimum alignment parking mode of a parking control apparatus according to an embodiment of the present disclosure.

FIG. 6 is an exemplary view illustrating setting of an optimum alignment parking mode of a parking control apparatus according to an embodiment of the present disclosure. FIG. 6 illustrates examples in the pillar/wall proximity parking mode (601), the center alignment parking mode (602), the driver seat convenience parking mode (603), and the passenger seat convenience parking mode (604) when the parking control apparatus 100 controls parking in the optimum alignment parking mode. In the pillar/wall proximity parking mode, parking is performed as close as possible to the pillar. In the center alignment parking mode, parking is performed in the center while being spaced apart from both side parking lines by the same distance. In addition, in the driver seat convenience parking mode, parking may be performed to further increase the distance from the parking line on the driver seat side to the vehicle so that the user of the driver seat may easily get off. In the passenger seat convenience parking mode, parking may be performed to further increase the distance from the parking line on the passenger seat side to the vehicle so that the user of the passenger seat may easily get off.

Figure 7:
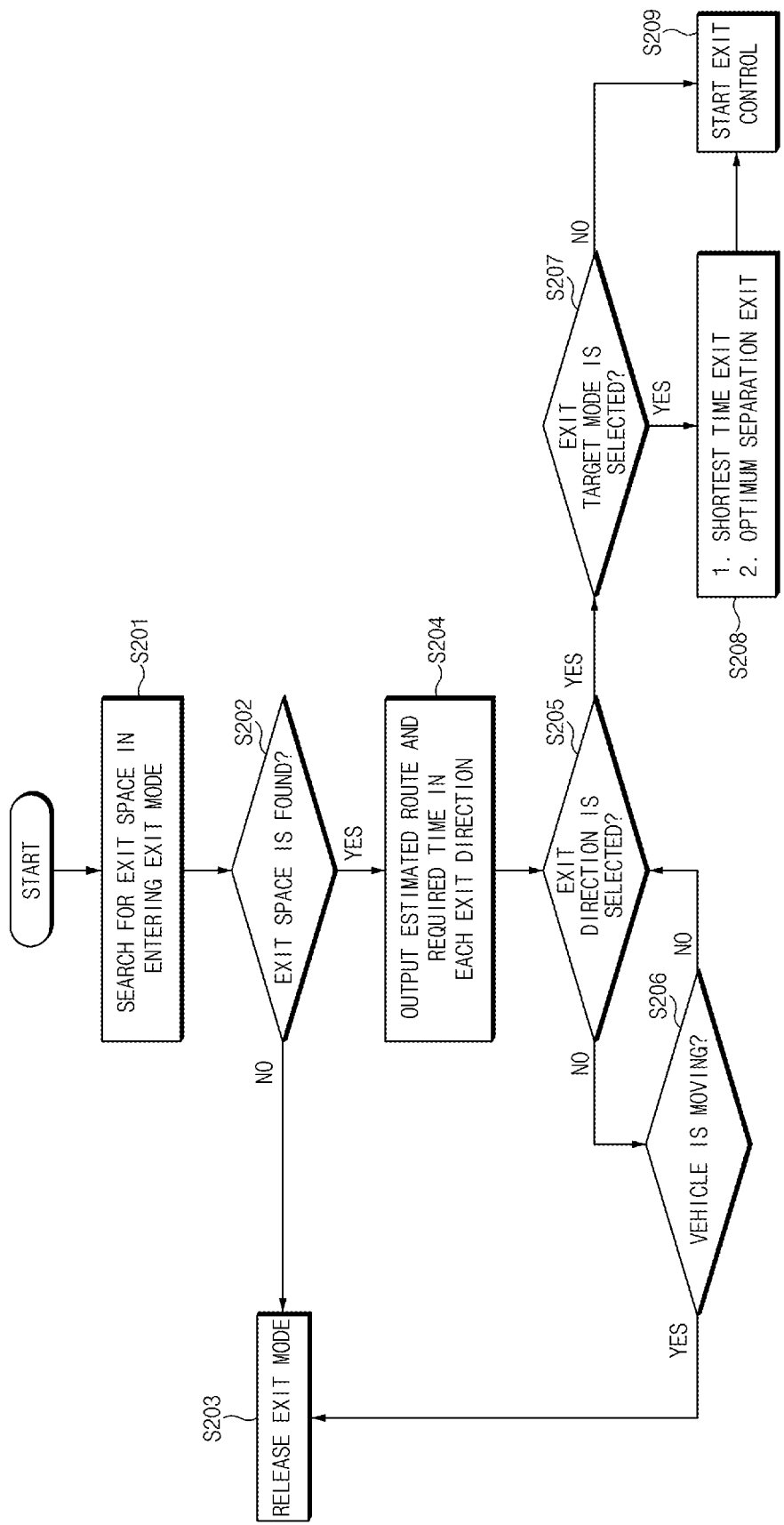
FIG. 7 is a flowchart illustrating a smart exit control method according to an embodiment of the present disclosure.

FIG. 7 is a flowchart illustrating a smart exit control method according to an embodiment of the present disclosure.

Hereinafter, it is assumed that the parking control apparatus 100 of FIG. 1 performs the process of FIG. 7. In addition, in the description of FIG. 7, it may be understood that the operations described as being performed by the apparatus are controlled by the processor 140 of the parking control apparatus 100.

Referring to FIG. 7, in operation S201, when the parking control apparatus 100 enters the smart exit mode, the parking control apparatus 100 searches for a space for exit.

In operation S202, the parking control apparatus 100 determines whether the exit space is detected, and releases the smart exit mode when the exit space is not found in operation S203.

In operation S204, when the exit space is found, the parking control apparatus 100 calculates the estimated route and required time in each exit direction and outputs the estimated route and required time through the display 130. When one of the estimated routes in each exit direction displayed on the display 130 is touched by the user, the corresponding exit direction may be selected.

The parking control apparatus 100 receives the selection of the exit direction from the user in operation S205. When the exit direction is not selected, the parking control apparatus 100 determines whether the vehicle is moving in operation S206. When the vehicle is moving, the parking control apparatus 100 determines that the vehicle is moving for exit and searches for an exit space again in operation S201.

Meanwhile, when the exit direction is selected by the user, the parking control apparatus 100 receives the selection of the exit target mode in operation S207. When the exit target mode is not selected, the parking control apparatus 100 performs the exit control in the basic exit target mode in operation S209.

Meanwhile, when one of the shortest time exit mode and the optimum separation exit mode of the exit target mode is selected in operation S208, the parking control apparatus 100 performs exit control in the selected exit mode in operation S209.

As described above, the parking control apparatus 100 of the present disclosure simultaneously displays the estimated route and the required time on the parking space display screen when the space search for smart exit is completed, and receives the exit target mode from the user. In this case, when the shortest time exit mode is selected as the exit target mode, because the parking distance warning sound may frequently occur, anxiety may be caused and a strong sense of braking to the obstacle may occur.

In addition, when the optimum separation exit mode is selected as the exit target mode, the exit time may take longer, but the parking distance warning sound may not occur, and a smooth sense of braking to the obstacle may be provided.

Figure 8:
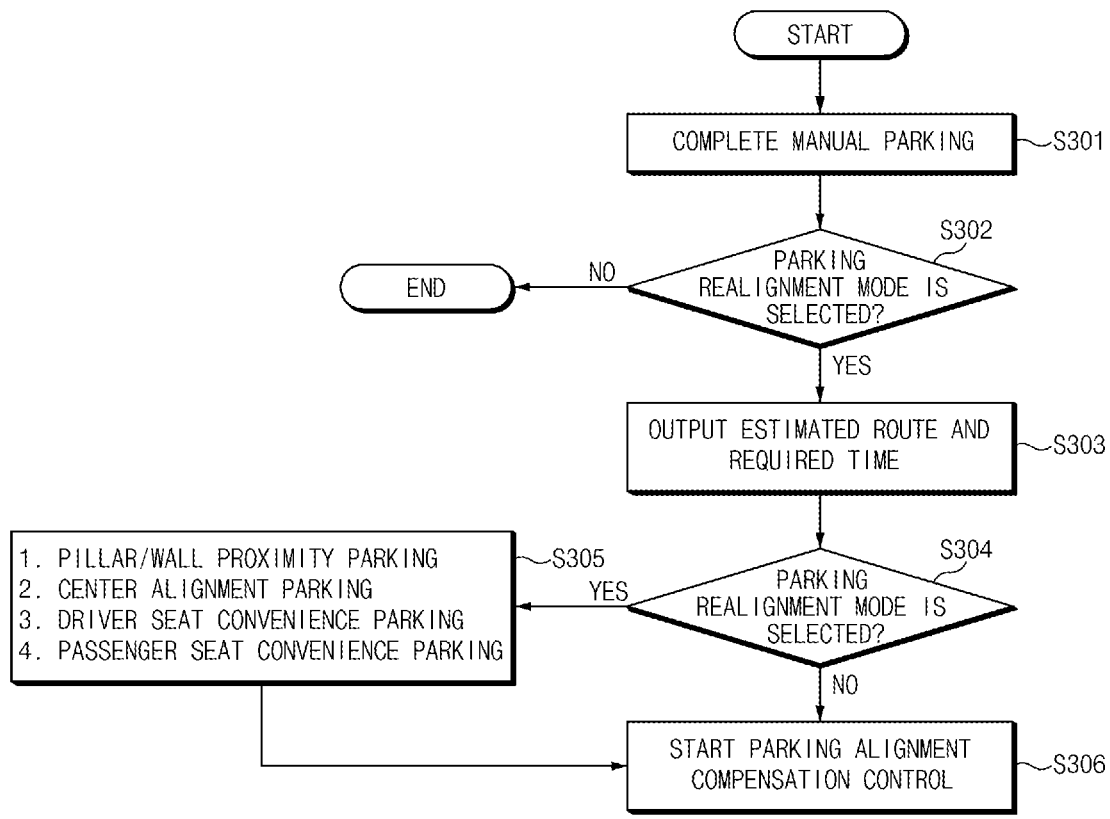
FIG. 8 is a flowchart illustrating a parking control method for a parking realignment after completion of manual parking according to an embodiment of the present disclosure.

FIG. 8 is a flowchart illustrating a parking control method for a parking realignment after completion of manual parking according to an embodiment of the present disclosure.

Hereinafter, it is assumed that the parking control apparatus 100 of FIG. 1 performs the process of FIG. 8. In addition, it may be understood that the operations described in FIG. 8 as being performed by the apparatus are controlled by the processor 140 of the parking control apparatus 100.

Referring to FIG. 8, after the manual parking is completed in operation S301, the parking control apparatus 100 checks whether the parking realignment mode is selected by the user in operation S302.

When the parking realignment mode is not selected, the parking control apparatus 100 determines that parking is completed and ends the vehicle system.

Meanwhile, when the parking realignment mode is selected, the parking control apparatus 100 calculates the estimated route and the required time for a parking realignment and outputs the estimated route and the required time on the screen in operation S303. Then, the parking control apparatus 100 receives the selection of the parking alignment mode by the user in operation S304.

When the parking alignment mode is not selected, the parking control apparatus 100 starts the parking alignment compensation control in the parking alignment mode set as default in operation S306.

When one of the pillar/wall proximity parking mode, the center alignment parking mode, the driver seat convenience parking mode, and the passenger seat convenience parking mode is selected as the parking alignment mode in operation S305, the parking control apparatus 100 performs the parking alignment compensation control in operation S306.

After the user completes the manual parking, it may be difficult to park the vehicle close to the desired angle of alignment or the pillar/wall according to the personal parking skill. Thus, when the parking realignment mode (the automatic realignment mode by the parking controller 100) is selected by the user after completion of the manual parking, the parking control apparatus 100 of the present disclosure recognizes the surrounding space situation through the camera and the ultrasonic sensor, and calculates and displays the estimated route and required time in the basic realignment mode (e.g., a center alignment) based on the generated route.

When the parking alignment mode is selected by the user for the parking realignment, the parking control apparatus 100 may recalculate the required time and route in the selected parking alignment mode and output the estimated time and route. In addition, when the parking mode button for entering the parking mode is inputted, the parking control apparatus 100 may perform the parking alignment compensation control as final setting.

As described above, according to the present disclosure, by guiding the estimated time required for parking, the user selects the parking mode according to the intention desired by the user and parking is automatically performed, so that the automatic parking is supported by reflecting the user tendency, thereby increasing the merchantability and convenience for individual consumers.

In addition, according to the present disclosure, it is possible to remove the psychological anxiety of the user about the situation of stopping in proximity to an object in the automatic parking by guiding the estimated parking route.

Figure 9:
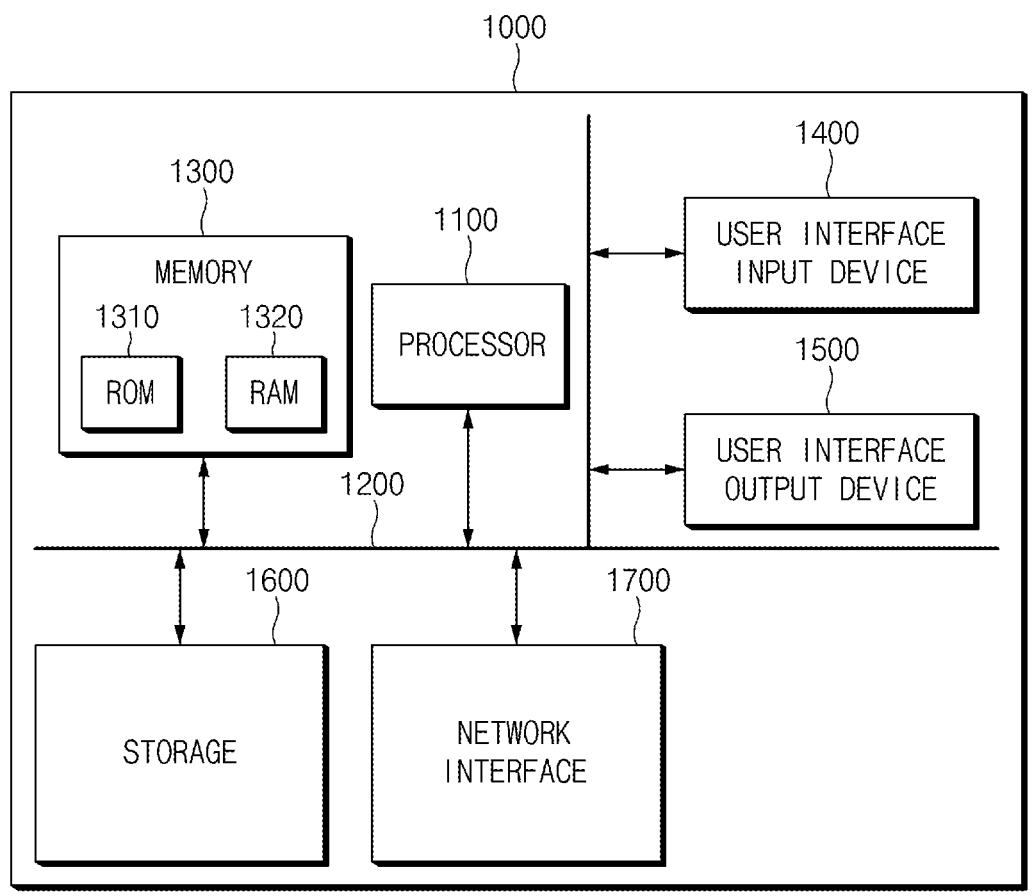
FIG. 9 is a view illustrating a computing system according to an embodiment of the present disclosure.

FIG. 9 is a view illustrating a computing system according to an embodiment of the present disclosure.

Referring to FIG. 9, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to the present technology, it is possible to increase the convenience of the user by providing information about a parking space to the user in support of automatic parking so that a parking space can be selected suitable to user intention.

In addition, various effects that are directly or indirectly understood through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The invention claimed is:

1. A parking control apparatus comprising:
a processor configured to search for a plurality of parking spaces in a parking control of a vehicle, calculate an estimated route and a required parking time for each of the plurality of parking spaces, and perform parking control into a target parking space which is one parking space selected from the plurality of parking spaces by a user; and
a display configured to display the estimated route and the required parking time for each of the plurality of parking spaces;
wherein the processor is configured to determine whether the vehicle is moving when one of the plurality of parking spaces is not selected by the user, and search for a parking space when the vehicle is moving; and
wherein the processor is configured to calculate an estimated route and a required parking time for realigning a parking space in which the vehicle is currently parked when a parking realignment mode is selected by the user after manual parking of the vehicle is completed, and to control a parking realignment.

2. The parking control apparatus of claim 1, wherein the processor is configured to perform the parking control based on a parking target mode or a parking alignment mode input by the user.

3. The parking control apparatus of claim 2, wherein the parking target mode includes a shortest time parking mode in which parking is completed in a shortest time, and an optimum alignment parking mode in which the vehicle is parked in the target parking space and is arranged to keep a distance from a parking line or an obstacle.

4. The parking control apparatus of claim 2, wherein the processor is configured to calculate an estimated parking route and a required parking time for the target parking space in the parking target mode and the parking alignment mode, and
wherein the display is configured to display the estimated parking route and the required parking time in the parking target mode and the parking alignment mode.

5. The parking control apparatus of claim 2, wherein the parking alignment mode includes an obstacle proximity parking mode in which the vehicle approaches an obstacle, a center-alignment parking mode, a driver seat convenience parking mode, and a passenger seat convenience parking mode.

6. The parking control apparatus of claim 2, wherein the display is configured to list and display the parking target mode or the parking alignment mode and receive a selection of one of listed menus by the user.

7. The parking control apparatus of claim 2, wherein the processor is configured to list the parking target mode or the parking alignment mode on a screen and deactivate a menu having no selection information among the listed menus.

8. The parking control apparatus of claim 1, wherein the processor is configured to calculate a remaining time until the parking completion in the required parking time during the parking control to the target parking space, and
wherein the display is configured to display the remaining time.

9. The parking control apparatus of claim 1, wherein the display is configured to transfer, to the processor, information about one of the plurality of parking spaces displayed on a screen when the one parking space is touched.

10. A parking control method comprising:
searching for a plurality of parking spaces in a parking control of a vehicle;
calculating an estimated route and a required parking time for each of the plurality of parking spaces;
displaying the estimated route and the required parking time calculated for each of the plurality of parking spaces;
receiving a selection of one of the plurality of parking spaces by a user as a target parking space;
performing parking control to the target parking space;
determining whether the vehicle is moving when one of the plurality of parking spaces is not selected by the user, and searching for a parking space when the vehicle is moving;
calculating an estimated route and a required parking time for realigning a parking space in which the vehicle is currently parked when a parking realignment mode is selected by the user after manual parking of the vehicle is completed; and
controlling a parking realignment.

11. The parking control method of claim 10, wherein the performing of the parking control to the target parking space includes performing the parking control based on a parking target mode or a parking alignment mode input from the user.

12. The parking control method of claim 11, wherein the parking target mode includes a shortest time parking mode in which parking is completed in a shortest time, and an optimum alignment parking mode in which the vehicle is parked in the target parking space and is arranged to keep a distance from a parking line or an obstacle, and wherein the parking alignment mode includes an obstacle proximity parking mode in which the vehicle approaches an obstacle, a center-alignment parking mode, a driver seat convenience parking mode, and a passenger seat convenience parking mode.

* * * * *